(12) United States Patent
Tu et al.

(10) Patent No.: US 8,430,544 B2
(45) Date of Patent: Apr. 30, 2013

(54) HEADLIGHT OF MOTORCYCLE

(75) Inventors: Shih-Wang Tu, Kaohsiung (TW);
Tai-Yuan Sue, Kaohsiung (TW);
Jung-Hung Hsieh, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 539 days.

(21) Appl. No.: 12/704,488

(22) Filed: Feb. 11, 2010

(65) Prior Publication Data
US 2010/0232170 A1 Sep. 16, 2010

(30) Foreign Application Priority Data

Mar. 10, 2009 (TW) .............................. 98107721 A (51) Int. Cl.
*B62J 6/02* (2006.01)
(52) U.S. Cl.
USPC .......................... 362/476; 362/549; 362/370
(58) Field of Classification Search .................. 362/475, 362/476, 549, 473, 370, 457; 248/200, 309.1
See application file for complete search history.

(56) References Cited

U.S. PATENT DOCUMENTS 6,158,279 A * 12/2000 Saiki ................................ 73/493
2007/0284172 A1* 12/2007 Satake et al. .................. 180/219

* cited by examiner

*Primary Examiner* — Jong-Suk (James) Lee
*Assistant Examiner* — Leah S Macchiarolo
(74) *Attorney, Agent, or Firm* — Leong C. Lei (57) ABSTRACT

A headlight of motorcycle includes a dashboard, a connection member, a headlight, a bracket, and front support racks. The dashboard is coupled to the headlight by the connection member in a modularized manner. The headlight forms coupling holes for mounting to the front support racks. The bracket carries signal lights thereon. By coupling the headlight and the dashboard together in a modularized manner and mounting the bracket that carries the signal lights to the opposite sides of the headlight, and further fixing the front support racks to the opposite sides of the headlight, a headlight module is formed. The headlight module can be easily attached between upper and lower beams of a steering handlebar by using the front support racks so as to simplify the assembling operation and to conceal the front support racks between the bracket and the steering handlebar for improving the outside appearance of the headlight.

17 Claims, 9 Drawing Sheets

HEADLIGHT OF MOTORCYCLE

TECHNICAL FIELD OF THE INVENTION

The present invention generally relates to a structure of headlight of motorcycle, and more particularly to a structure of modularization of motorcycle headlight and dashboard to improve assembling operation and enhance outside appearance of the motorcycle.

DESCRIPTION OF THE PRIOR ART

Motorcycles are commonly used and play an important role as short distance transportation. A huge number of motorcycles are manufactured and sold in the market each year, making a substantial contribution to the economic development. In respect of transportation, besides public transportation, such as subways and buses, private transportation, such as passenger cars and motorcycles, is also commonly used. The motorcycle is advantageous of being convenient and efficient, and is not matched by other transportation means in these respects.

Figure 1:
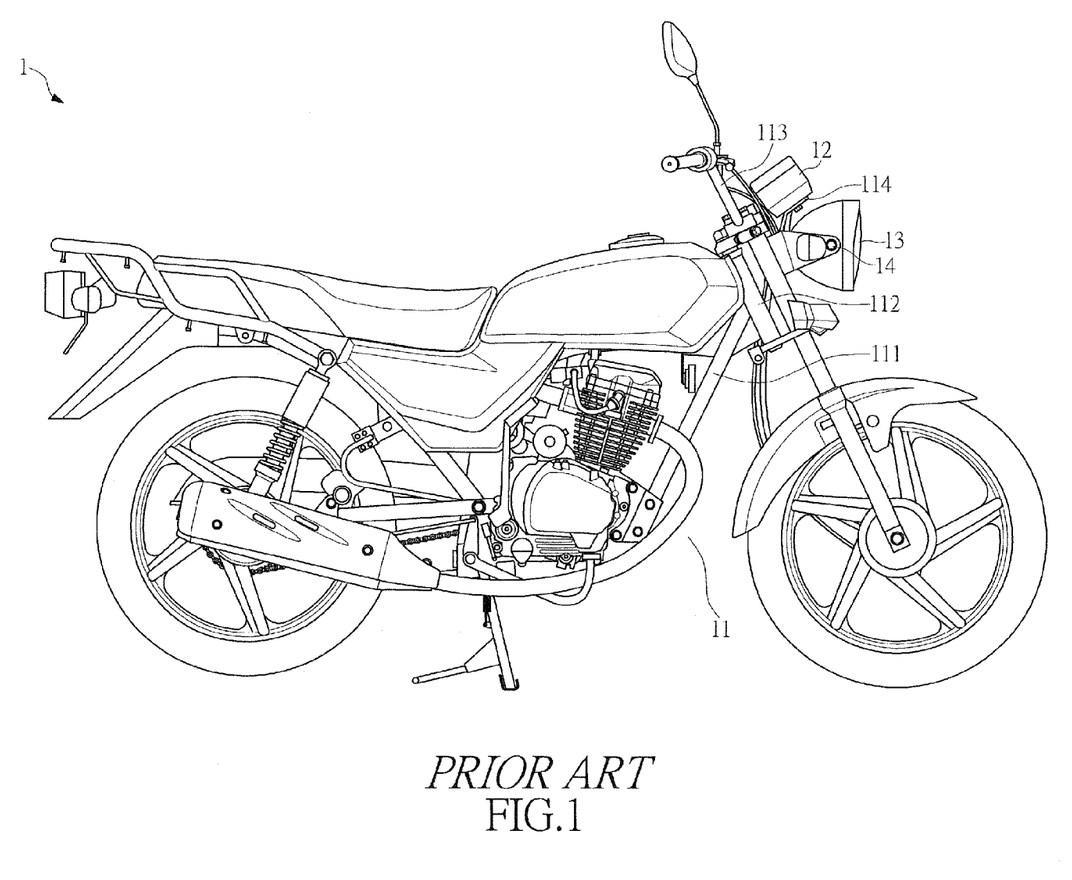
FIG. 1 is a side elevational view illustrating a conventional motorcycle.

Referring to FIG. 1 of the attached drawings, a conventional motorcycle 1 comprises a frame 11 that has a main tube 111. A head tube 112 is set in front of the main tube 111. The head tube 112 rotatably supports steering handlebars 113. The main tube 111 and the head tube 112 are extended frontward to form a front support 114 that extends upwards and rotatably supports a dashboard 12. A headlight 13 is mounted to the front side of the front support 114. The dashboard 12 provides information of vehicle movement to a rider and the headlight 13 provides lighting and alarming. However, since the dashboard 12 is fixed above of the front support 114, when the motorcycle 1 is in movement, the magnitude of vibration occurring in the dashboard 12 is magnified, leading to damage of the internal components of the dashboard 12. Further, the fact that the front support 114 is exposed also makes the motorcycle 1 poor in outside appearance. In addition, excessive extension of the front support 114 may lead to severely magnified vibration, and may also result in easy loosening of adjustment bolts 14 set on the opposite sides of the leadlight 13. Further, in the conventional structure, the headlight 13 and the dashboard 12 are assembled separately and achieving a desired precision in matching the two is difficult, leading to complication of assembling.

In view of the above discussed problems of the conventional coupling structure of the motorcycle dashboard, it is a challenge of the motorcycle industry to develop a coupling structure that protects the dashboard from damage caused by vibration induced in the movement of the motorcycle.

SUMMARY OF THE INVENTION

The primary objective of the present invention is to provide a headlight of motorcycle, comprising at least a dashboard, a connection member, a headlight, a bracket, and front support racks. The dashboard forms a plurality of fixation studs projecting therefrom. The connection member has an upper portion forming a first fixation end that defines a plurality of fixation holes corresponding to the fixation studs for receiving the fixation studs to extend therethrough and be secured by nuts. The support element has a lower portion forming a second fixation end that defines a plurality of connection holes and forms a bent positioning section below the connection holes. The headlight comprises a retention seat from which a plurality of threaded rods projects to correspond to the connection holes of the connection member. The headlight forms a plurality of coupling holes on outer sides thereof for mounting to the front support racks. The bracket has two opposite side portions to which signal lights are respectively mounted. By securing the connection member between the dashboard and the headlight to make the headlight and the dashboard modularized and then threadingly mounting the bracket to opposite sides of the headlight to be attached, together with the front support racks, to the headlight, a headlight module is formed and the headlight module can be easily attached between upper and lower beams of a steering handlebar to simplify the assembling operation. Further, the front support racks are concealed between the bracket and the steering handlebar so that the outside appearance of the headlight as a whole can be improved.

Another technical solution of the present invention is to provide a headlight of motorcycle, comprising at least a dashboard, a connection member, a headlight, a bracket, and front support racks. The dashboard forms a plurality of fixation studs projecting therefrom. The support element has a first fixation end that defines a plurality of fixation holes corresponding to the fixation studs for receiving the fixation studs to extend therethrough and be secured by nuts. Each fixation hole forms a side opening through which a resilient element is fit into the fixation hole. The resilient element forms a through hole for fitting over a corresponding fixation stud of the dashboard. The resilient element absorbs the vibration induced by the movement of the motorcycle thereby providing further effect of suppression of vibration of the dashboard.

A further objective of the present invention is to provide a headlight of motorcycle, comprising at least a dashboard, a connection member, a headlight, a bracket, and front support racks. The headlight comprises an adjustment device, which functions to realize fine adjustment of elevation angle of a bulb of the headlight. As such, a rider of the motorcycle can adjust the elevation angle of the bulb of the headlight by himself or herself without using a tool.

A further objective of the present invention is to provide a headlight of motorcycle, comprising at least a dashboard, a connection member, a headlight, a bracket, and front support racks. Each of the front support racks comprises a bar that has an upper portion forming a locking hole that has a raised rim and a cushioning member and a lower portion forming a positioning plate. The bar also forms connection sections corresponding to the coupling holes of the headlight. The raised rim carries the cushioning member thereon to prevent and absorb shocks induced in frontward, rearward, upward, and downward directions caused by vibration occurring during the movement of the motorcycle so as to protect internal components of the dashboard from damage by the vibration.

Yet a further objective of the present invention is to provide a headlight of motorcycle, comprising at least a dashboard, a connection member, a headlight, a bracket, and front support racks. The headlight is mounted between upper and lower beams of a head tube of the motorcycle and the lower beam carries a cushioning member by which vibration of the headlight module can be reduced.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 2:
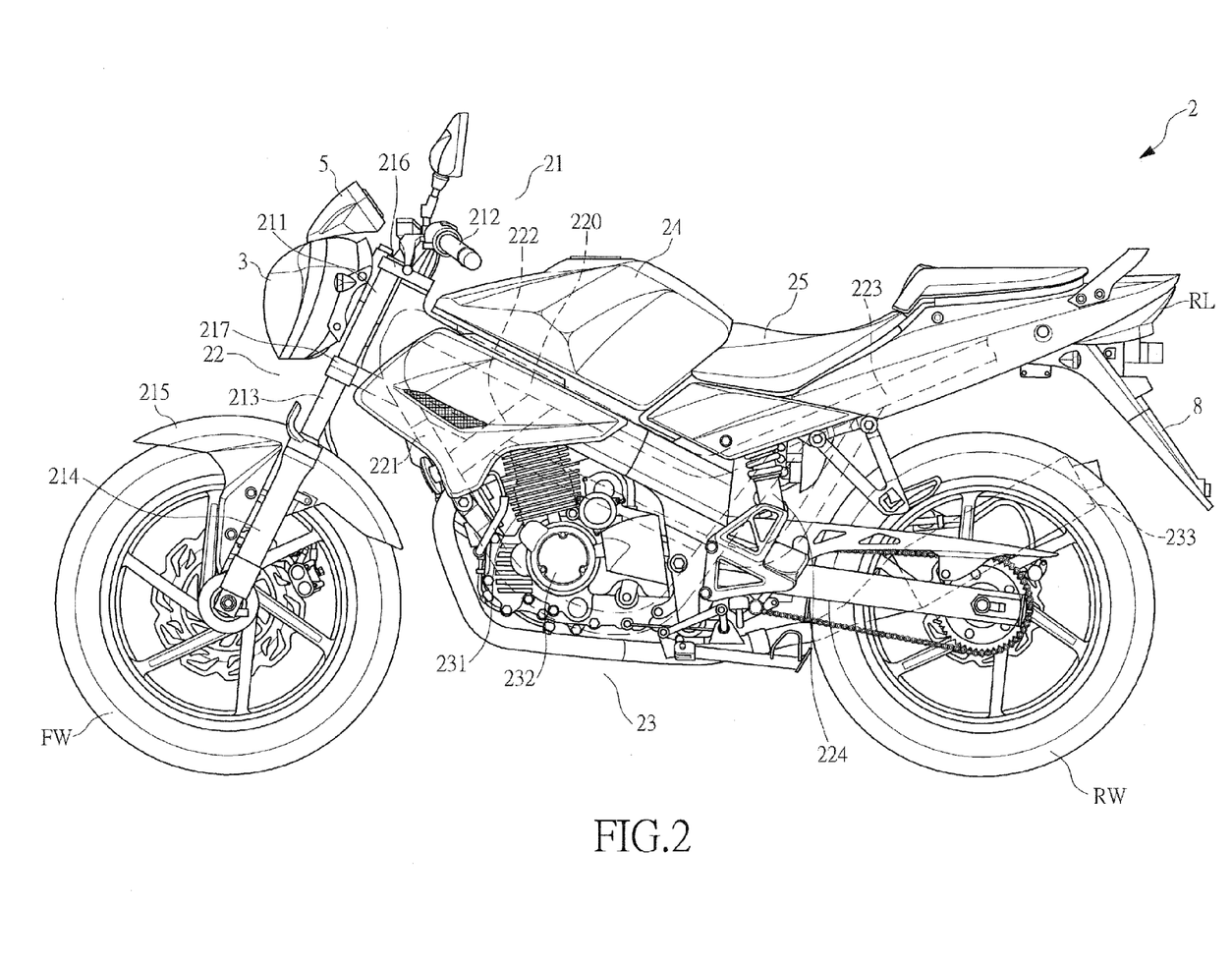
FIG. 2 is a side elevational view of a motorcycle in accordance with the present invention.

Referring to FIG. 2, which shows a side elevational view of a motorcycle constructed in accordance with the present invention, the motorcycle, generally designated at 2, comprises a steering mechanism 21, a frame unit 22, a power unit 23, a fuel tank 24, and a driver's seat 25.

The steering mechanism 21 comprises a head tube 211 that supports thereon a steering handlebar 212. A headlight 3 is mounted to a front side of the head tube 211. A dashboard 5 is mounted above the headlight 3. The head tube 211 comprises a front fork 213 at a lower end thereof and coupled to front shock absorbers 214. The front shock absorbers 214 are supported, at lower ends thereof, by a front wheel FW. A front fender 215 is mounted between the head tube 211 and the front wheel FW. The headlight 3 is mounted between upper and lower beams 216, 217 of the head tube 211. The lower beam 217 supports thereon a cushioning member 218.

The frame unit 22 comprises a main tube 220 extending from an upper portion of the head tube 211 in a rearward direction and inclining downward. A lower tube 221 extends downwards from a middle portion of the head tube 211. A reinforcement tube 222 is arranged between the main tube 220 and the lower tube 221.

The power unit 23 is arranged between the main tube 220 and the lower tube 221. A rear frame 223 extends from a front end of the driver's seat 25 toward a rear side of the motorcycle 2 to reach a tail of the motorcycle. The rear frame 223 supports the driver's seat 25. Rear shock absorbers 224 are arranged under the rear frame 223 and the rear shock absorbers 224 are supported by a rear wheel RW. Further, the rear frame 223 carries a tail light RL at a rear end thereof A rear fender 8 is arranged between the tail light RL and the rear wheel RW.

The power unit 23 comprises at least one engine 231, a crankshaft transmission 232, and an exhaust pipe 233. The engine 231 comprises a piston and a combustion chamber (not shown). The engine 231 is suspended on an engine rack. The crankshaft transmission 232 comprises a crankshaft and a transmission system (not shown).

The fuel tank 24 is set between the rear side of the head tube 211 and the driver's seat 25. The fuel tank 24 is formed by welding upper and lower tank shells (not shown) to define an interior space for accommodating fuel of the motorcycle 2.

The driver's seat 25 comprises a cushion having a bottom forming a seat shell made of a rigid material and an upper portion made of a soft material and enclosed by a decoration layer to allow a driver to comfortably sit thereon.

Figure 3:
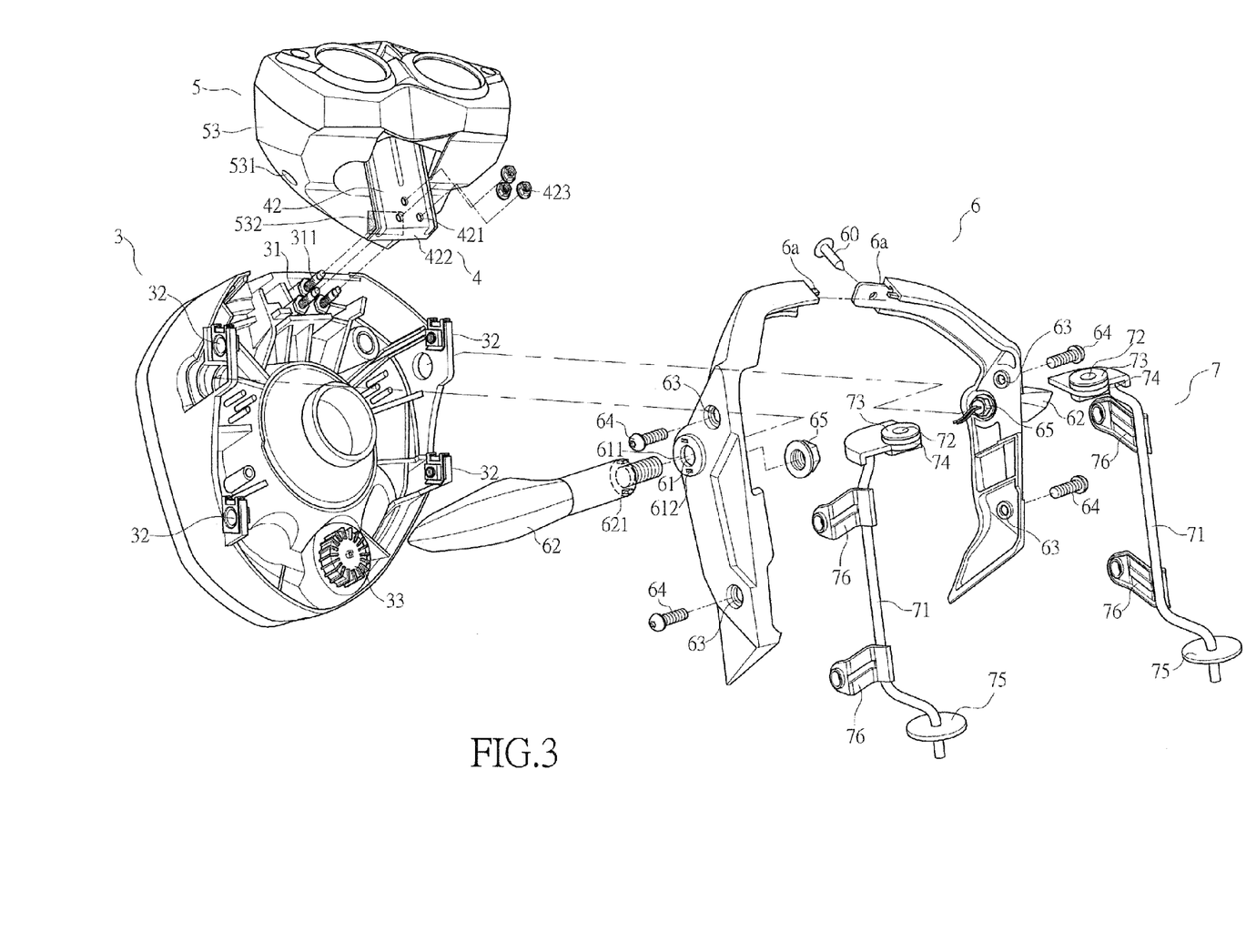
FIG. 3 is an exploded view of a headlight, a dashboard, a bracket, and front support racks in accordance with the present invention.
Figure 4:
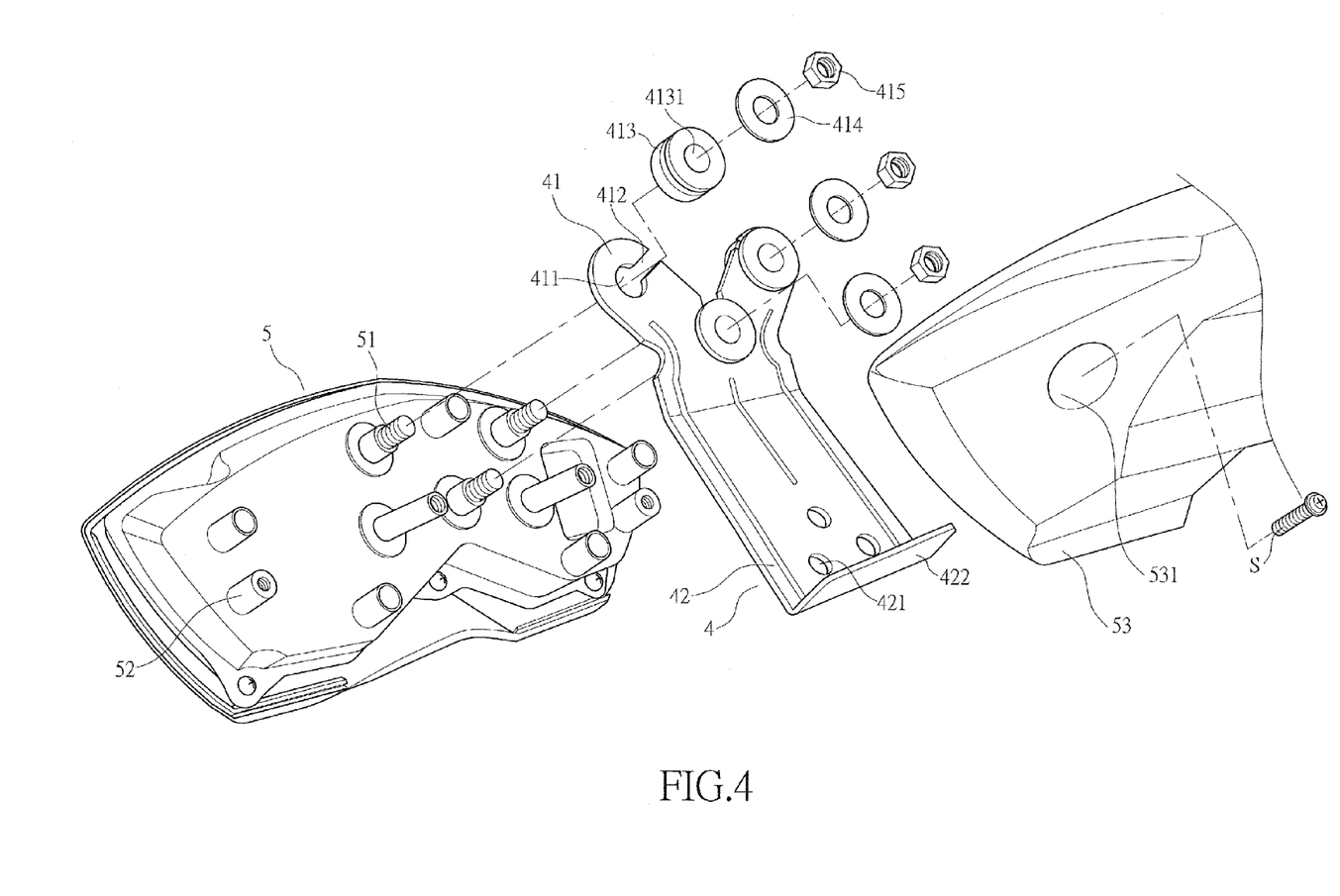
FIG. 4 is an exploded view of the dashboard according to the present invention.

Referring to FIGS. 3 and 4, a headlight structure in accordance with the present invention comprises at least the headlight 3, a connection member 4, the dashboard 5, a bracket 6, and two front support racks 7.

The headlight 3 is arranged at the front end of the motorcycle 2. The headlight 3 comprises a retention seat 31 above the headlight 3. The retention seat 31 forms a plurality of threaded rods 311 projecting therefrom and corresponding to the connection holes 421 of the connection member 4. The headlight 3 also forms a plurality of coupling holes 32. The headlight 3 comprises an adjustment device 33, which functions for fine adjustment of elevation angle of a lighting bulb of the headlight 3.

The connection member 4 comprises a board made of a rigid material. The connection member 4 has an upper portion forming a first fixation end 41 in the form of a Y-shape. The first fixation end 41 forms a plurality of fixation holes 411 corresponding to fixation studs 51 of the dashboard 5. Each fixation hole 411 forms a side opening 412 through which a resilient element 413 can be fit into the fixation hole 411. The resilient element 413 comprises a rubber body. The resilient element 413 forms in a center thereof a through hole 4131 for fitting over a corresponding fixation stud 51 of the dashboard 5. The connection member 4 has a lower portion forming a second fixation end 42. The second fixation end 42 forms a plurality of connection holes 421 and a bent positioning section 422 below the connection holes 421.

The dashboard 5 comprises a plurality of fixation studs 51 extending from a central portion of a rear side wall thereof. A plurality of internally-threaded positioning pegs 52 is formed on opposite sides of the fixation studs 51. The fixation studs 51 are arranged in an inverted triangle. The dashboard 5 also comprises and is covered by an enclosure 53. The enclosure 53 forms through holes 531 corresponding to the internally-threaded positioning pegs 52. The through holes 531 receive fastening elements S to extend therethrough and threadingly engage the internally-threaded positioning pegs 52 in order to couple the enclosure 53 and a main body of the dashboard 5 together. The enclosure 53 has a bottom having a front flange extending toward a front side of the vehicle and carrying a shock absorption element 532, which is made of resilient rubber materials.

The bracket 6 comprises two opposite bracketing members. Central portions of the bracket 6 forms coupling sections 6a, which are coupled to each other by a fastener 60 made of plastics, whereby easy assembling and disassembling for maintenance can be realized through the use of the fastener 60. Two side portions of the bracket 6 each form one fixation hole 61 to which a signal light 62 can be fixed. The fixation hole 61 has a raised flange 611 in which at least one positioning hole 612 is formed. The signal light 62 has a joint section for mounting to the bracket 6 and the joint section forms pegs 621 corresponding to the positioning holes 612. The bracket 6 also forms through holes 63 corresponding to the coupling holes 32 of the headlight 3. The through holes 63 receive threaded fastening elements 64 therein.

Each front support rack 7 comprises a bar 71 that has an upper portion forming a locking hole 72. The locking hole 72 comprises a raised rim 73 and a cushioning member 74. The bar 72 has a lower portion forming a positioning plate 75. The bar 71 also forms connection sections 76 corresponding to the coupling holes 32 of the headlight 3.

Figure 5:
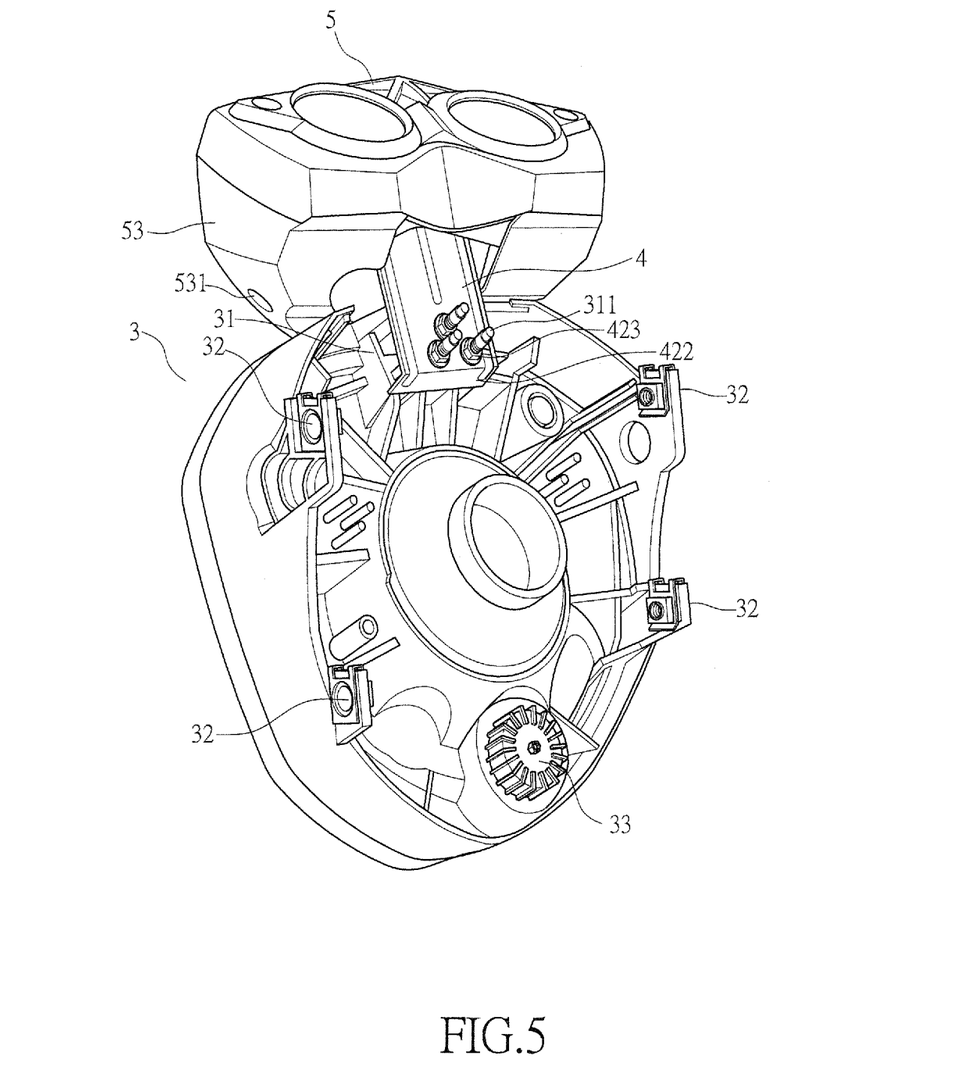
FIG. 5 is a perspective view of the dashboard and headlight of the present invention in an assembled form.
Figure 6:
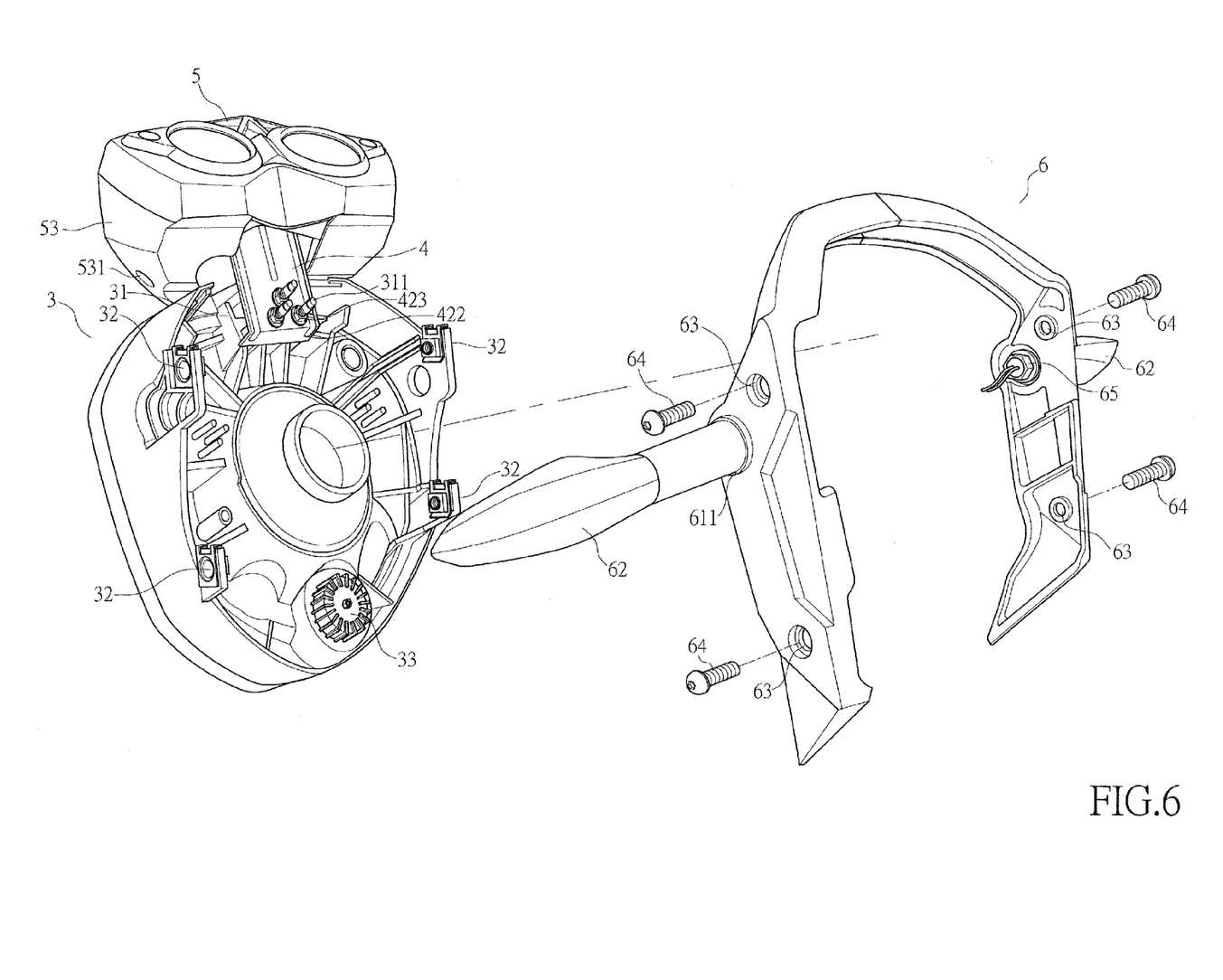
FIG. 6 is a perspective view showing the dashboard and the headlight and the bracket of the present invention in a detached form.
Figure 7:
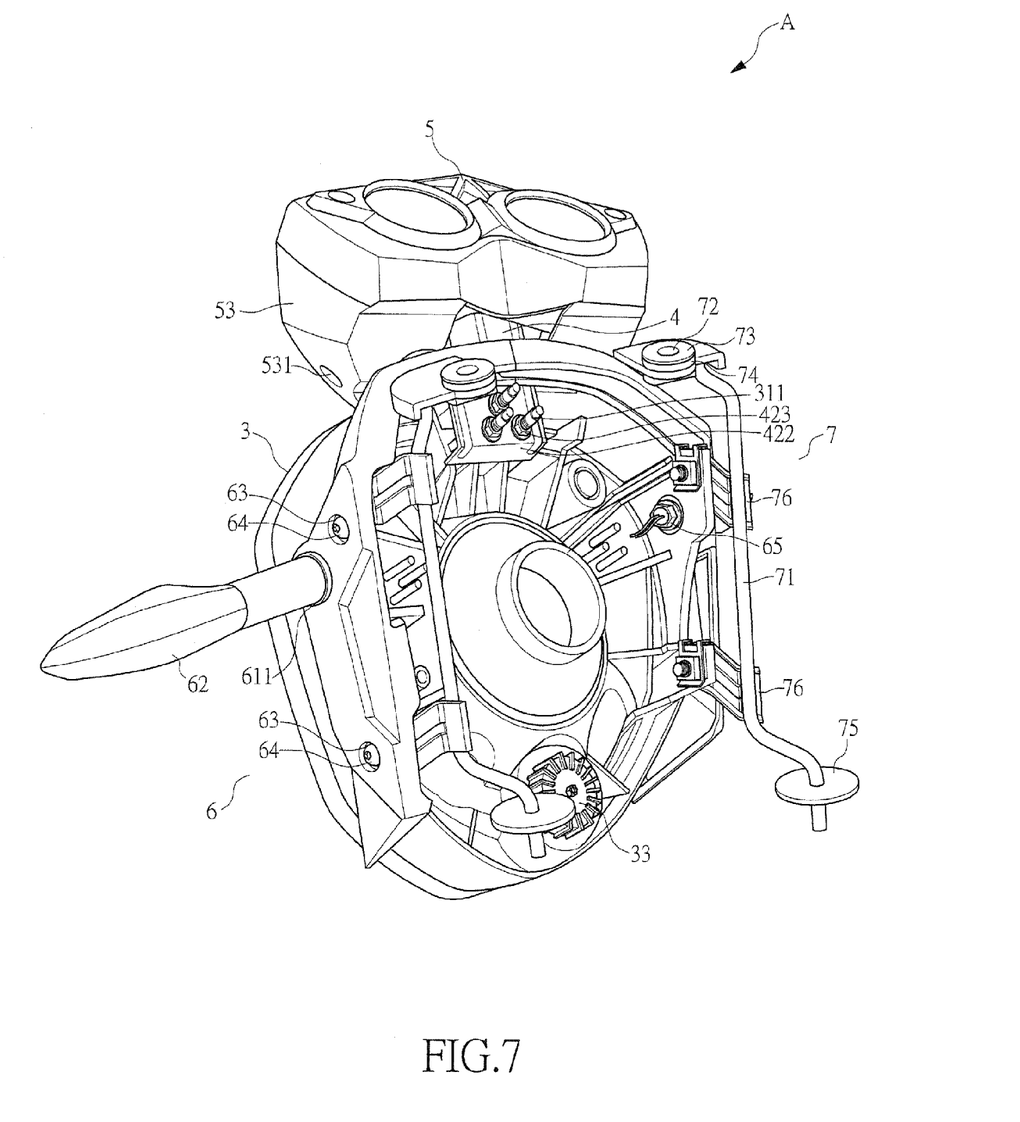
FIG. 7 is a perspective view showing the headlight of the present invention in a modularized form.

Referring to FIGS. 5, 6, and 7, to practice the present invention, the fixation holes 411 of the first fixation end 41 of the connection member 4 are first fit with the resilient elements 413 and the resilient elements 413 are fit over the fixation studs 51 of the dashboard 5. A washer 414 is fit over each fixation stud 51 and a nut 415 is tightened to couple the connection member 4 to the dashboard 5. The enclosure 53 is then secured to the internally-threaded positioning pegs 52 of the dashboard 5. Afterwards, the connection holes 421 of the second fixation end 42 of the connection member 4 are set corresponding to and fit over the threaded rods 311 of the retention seat 31 of the headlight 3 and then secured by nuts 423. Under this condition, the positioning section 422 of the connection member 4 is positioned against a bottom of the retention seat 31 and the shock absorption element 532 provided on the bottom of the enclosure 53 is positioned against a top of the headlight 3. As such, the dashboard 5 and the headlight 3 can be coupled together through the connection member 5 in a modularized manner. The signal lights 6 and the bracket 6 are coupled together separately. When the signal lights 62 are fit to the fixation holes 61 of the bracket 6, the pegs 621 of the signal lights 62 are fit into the positioning holes 612 of the flanges 611 of the fixation holes 61 so as to provide excellent positioning of the signal lights 61, which are then secured by nuts 65. Afterwards, the bracket 6 is set on opposite sides of the headlight 3 with the through holes 63 of the bracket 6 corresponding to the coupling holes 32 of the headlight 3. The threaded fastening elements 64 are inserted through the through holes 63 of the bracket 6 to threadingly engage the coupling holes 32 of the headlight 3 and to further threadingly engage the connection sections 76 of the two front support racks 7.

Figure 8:
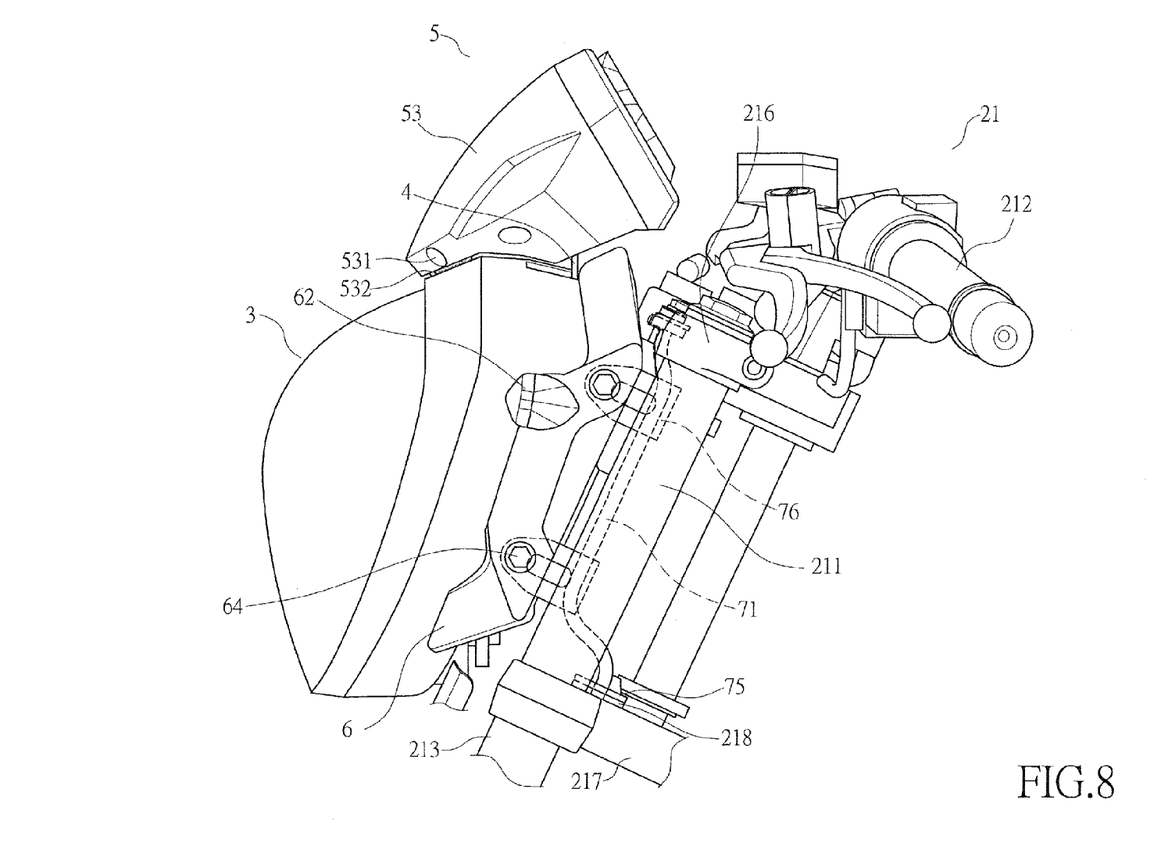
FIG. 8 is a side elevational view showing the headlight of the present invention mounted to a motorcycle.
Figure 9:
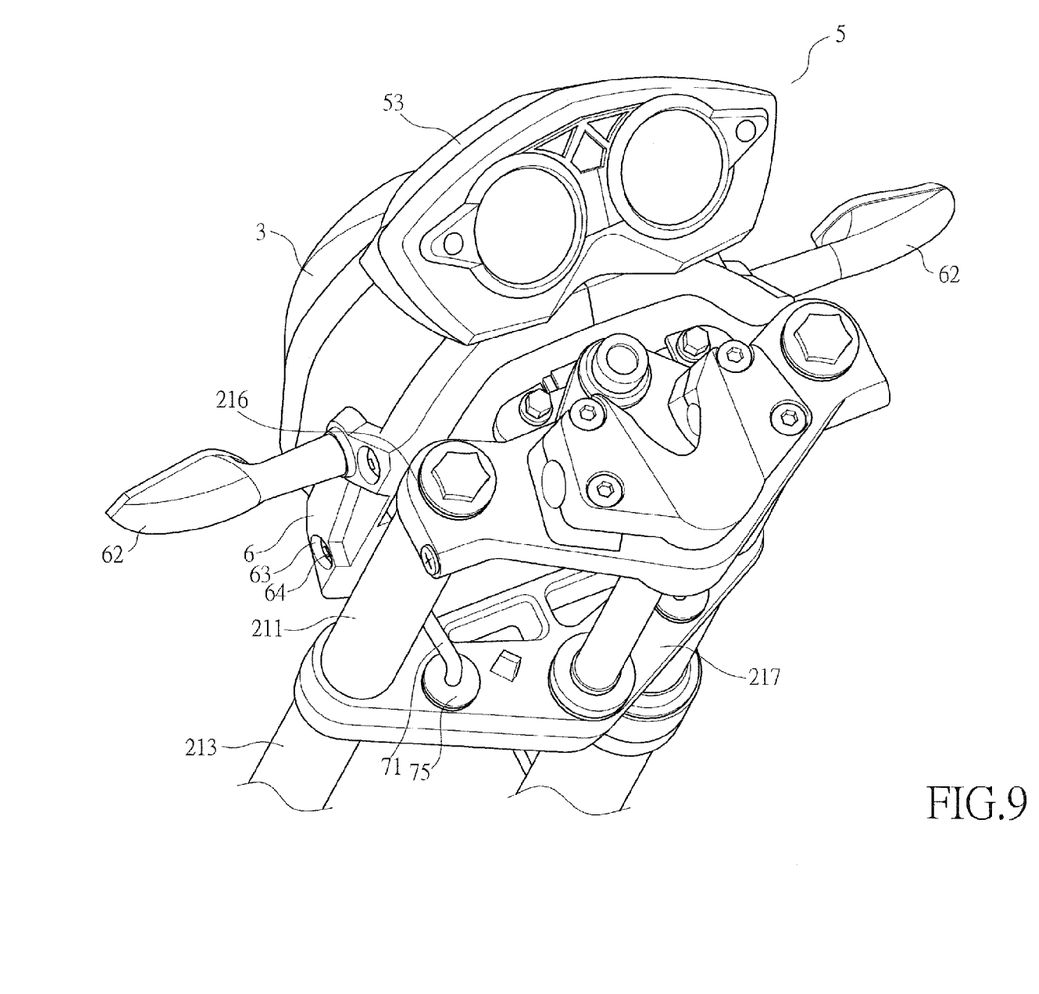
FIG. 9 is a perspective view showing the headlight of the present invention mounted to the motorcycle.

Referring to FIGS. 8 and 9, according to the present invention, the headlight 3 and the dashboard 5 are first assembled in a modularized manner, and then the bracket 6 and the signal lights 62 are assembled together and coupled, together with the front support racks 7, to the headlight 3 to form a headlight module A. To mount the headlight module A to the head tube 211, the front support racks 7 are inserted into the lower beam 217 of the head tube 211 with the lower portions thereof and the locking holes 72 of the upper portion of the front support racks 7 are secured to the upper beam 216 of the head tube 211. In this way, the headlight module A is secured in front of the motorcycle 2.

The effectiveness of the present invention is that by securing the connection member 4 between the dashboard 5 and the headlight 3 to assemble the headlight 3 and the dashboard 5 in advance in a modularized manner and then the bracket 6 and the signal lights 62 are assembled together also in a modularized manner and further coupled to the headlight 3 together with the front support racks 7 to thereby form a modularized headlight module A, as shown in FIG. 7. In this way, by mounting the headlight module A to the head tube 211 of the motorcycle 2, the assembling operation of the headlight 3 and the dashboard 5 can be simplified. By first assembling the dashboard 5 and the headlight 3 together to form a module, the problem of keeping precision in matching the dashboard 5 and the headlight 3 that are installed separately can be eliminated. The connection holes 421 and the positioning section 422 of the connection member 4, the shock absorption element 532 arranged under the enclosure 53, and the cushioning members 74 of the front support racks 7 are helpful in preventing the dashboard 5 from shaking in frontward, rearward, upward, and downward directions during the movement of the motorcycle 2 and thus protecting the internal components of the dashboard 5 from damage caused by vibration. Further, the fixation hole 411 of the connection member 4 is fit with a resilient element 413 and then fit over the corresponding fixation stud 51 of the dashboard 5. This effectively absorbs vibration induced by the movement of the motorcycle 2 to provide further suppression of vibration of the dashboard 5. Further, with the cushioning member 218 provided on the upper beam 217, the vibration induced on the headlight module A can be reduced. Further, by mounting the bracket 6 on the headlight 3 and extending fastening elements S through the through holes 63 of the bracket 6 to tighten to the opposite sides of the head tube 211 of the motorcycle 2, efficient positioning for assembling can be realized. The bracket 6 and opposite sides of the headlight 3 can be tightly positioned against each other to provide a unified outside appearance that enhances product appealing of the motorcycle 2. Further, by using the bracket 6 and the headlight 3 to conceal the front support racks 7, product appealing of the motorcycle 2 can be further enhanced.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A headlight of motorcycle, at least comprising:
    a steering mechanism, which comprises a head tube that supports thereon a steering handlebar, a headlight being mounted to a front side of the head tube;
    a dashboard, which comprises fixation studs;
    a connection member, which comprises a first fixation end and a second fixation end;
    a headlight, which comprises a retention seat and coupling holes;
    a bracket, which has opposite side portions forming fixation holes and through holes; and
    two front support racks, each of which comprises a bar that has an upper portion forming a locking hole that comprises a raised rim and a cushioning member, the bar having a lower portion forming a positioning plate, and the bar forming connection sections corresponding to the coupling holes of the headlight;
    wherein the through holes of bracket are set to correspond to the coupling holes of the headlight and the connection sections of the two front support racks and are threadingly secured together, the front support racks having lower portions that are inserted into a lower beam of the steering handlebar of the motorcycle, the locking holes formed in the upper portions of the front support racks being secured to an upper beam of the steering handlebar, whereby a headlight module is formed by first assembling the headlight and the dashboard together with the connection member and mounting the bracket to which signal lights are attached and the front support racks to opposite sides of the headlight, and wherein the headlight module is attachable between upper and lower beams of the steering mechanism of the motorcycle through the front support racks.

2. The headlight of motorcycle according to claim 1, wherein the second fixation end of the connection member forms a bent positioning section.

3. The headlight of motorcycle according to claim 2, wherein the first fixation end of the connection member is formed in a Y-shape and defines a plurality of fixation holes, each of the fixation holes forming a side opening.

4. The headlight of motorcycle according to claim 1, wherein the fixation studs of the dashboard are arranged in an inverted triangle and wherein the dashboard comprises an enclosure that has a bottom to which a shock absorption element made of rubber is mounted.

5. The headlight of motorcycle according to claim 1, wherein the fixation holes of the connection member each receive a resilient element made of rubber fit therein and wherein the resilient element forms a through hole in a center thereof.

6. The headlight of motorcycle according to claim 1, wherein the bracket forms through holes corresponding to the coupling holes of the headlight.

7. The headlight of motorcycle according to claim 1, wherein the dashboard has a back side wall which forms threaded positioning pegs.

8. The headlight of motorcycle according to claim 1, wherein the headlight comprises an adjustment device for fine adjustment of elevation angle of a bulb of the headlight.

9. The headlight of motorcycle according to claim 1, wherein the bracket comprises components that are coupled to each other at a central portion of the bracket by a fastener.

10. The headlight of motorcycle according to claim 1, wherein the bracket forms fixation holes each has a raised flange.

11. The headlight of motorcycle according to claim 10, wherein the raised flange forms at least one positioning hole.

12. The headlight of motorcycle according to claim 1, wherein each signal light has a joint section coupled to the bracket, the joint section forming a projecting peg.

13. The headlight of motorcycle according to claim 1, wherein the locking hole of each of the front support racks forms a raised rim.

14. The headlight of motorcycle according to claim 13, wherein the raised rim carries a cushioning member.

15. The headlight of motorcycle according to claim 1, wherein each of the front support racks has a lower portion forming a positioning plate.

16. The headlight of motorcycle according to claim 1, wherein the retention seat of the headlight forms threaded rods.

17. The headlight of motorcycle according to claim 1, wherein the lower beam supports thereon a cushioning member.

* * * * *